Feb. 3, 1959　　　E. V. DUNLAP　　　2,871,883
MOTOR-OPERATED VALVE

Filed Nov. 9, 1954　　　　　　　3 Sheets-Sheet 1

Inventor
Edwin V. Dunlap
By McCanna and Morsbach
Attys.

Feb. 3, 1959 — E. V. DUNLAP — 2,871,883
MOTOR-OPERATED VALVE
Filed Nov. 9, 1954 — 3 Sheets-Sheet 2
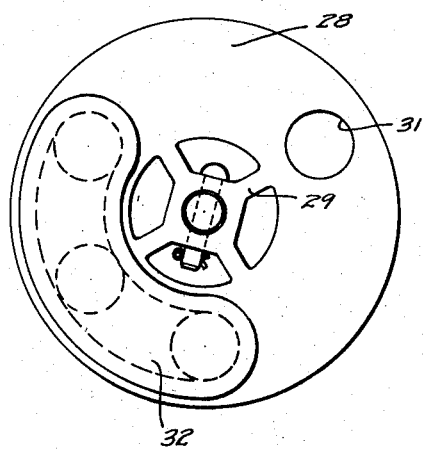
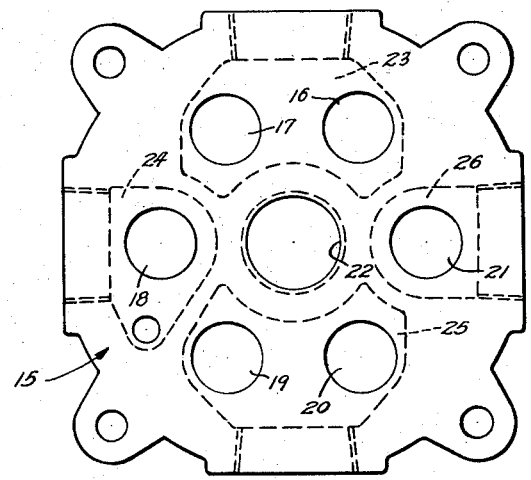
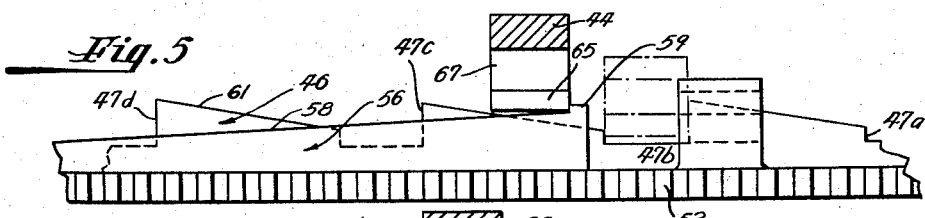
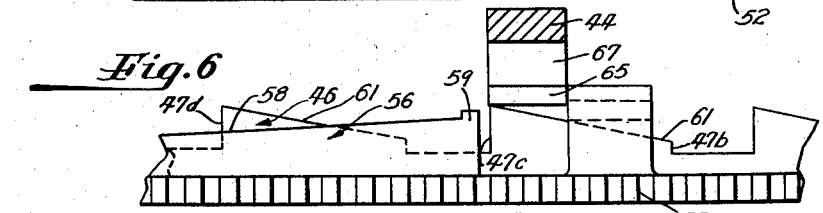
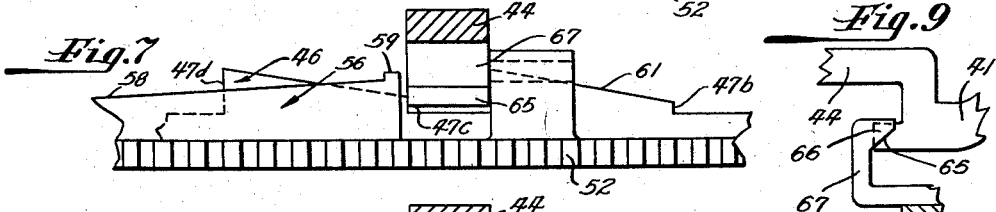
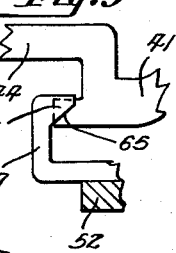
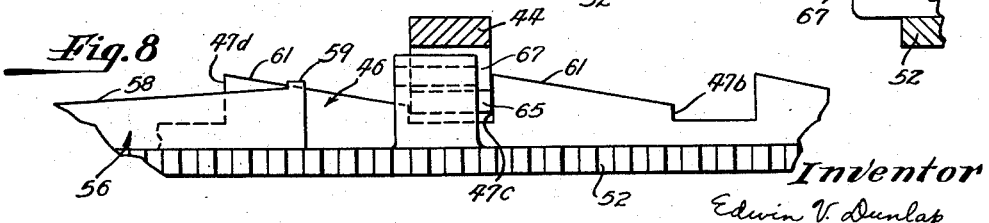
Inventor
Edwin V. Dunlap
By McCanna and Morsbach
Attys.

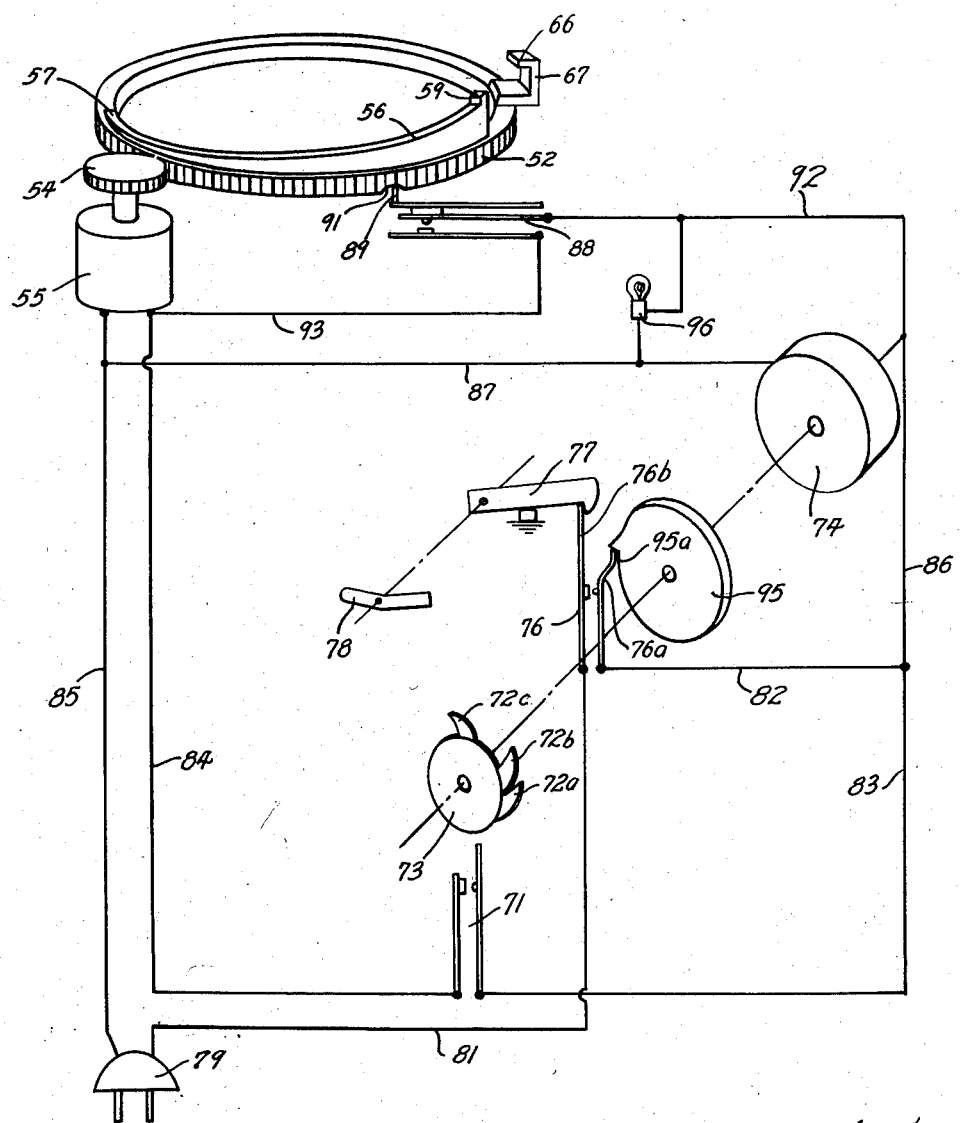

United States Patent Office 2,871,883
Patented Feb. 3, 1959

2,871,883

MOTOR-OPERATED VALVE

Edwin V. Dunlap, Santa Rosa, Calif., assignor to Aqua Matic Inc., Rockford, Ill., a corporation of Illinois Application November 9, 1954, Serial No. 467,728

6 Claims. (Cl. 137—633)

This invention comprises novel and useful improvements in multiport valves, and more particularly pertains to a motor operated valve of the lift-turn type.

An important object of this invention is the provision of a multiport valve of the lift-turn type with a motor operated drive therefor which is so arranged that the valve can also be manually operated between any of its several positions.

Another object of this invention is the provision of a motor operated valve of the lift-turn type which is of simple and compact construction and which is reliable in operation.

These, together with various ancillary objects and advantages of this invention will be more readily appreciated as the same becomes better understood by reference to the following detailed description when taken in connection with the accompanying drawings wherein:

Fig. 3 is a top plan view of the rotor;

Fig. 4 is a plan view of the valve stator;

Figs. 5 through 8 are developed views of the cam mechanism showing the parts in various stages of the indexing movement;

Fig. 9 is a fragmentary view showing a portion of the valve operating handle and cam mechanism in the position thereof illustrated in Fig. 6 of the drawings; and Fig. 10 is a schematic wiring diagram of the valve control mechanism.

Figure 1:
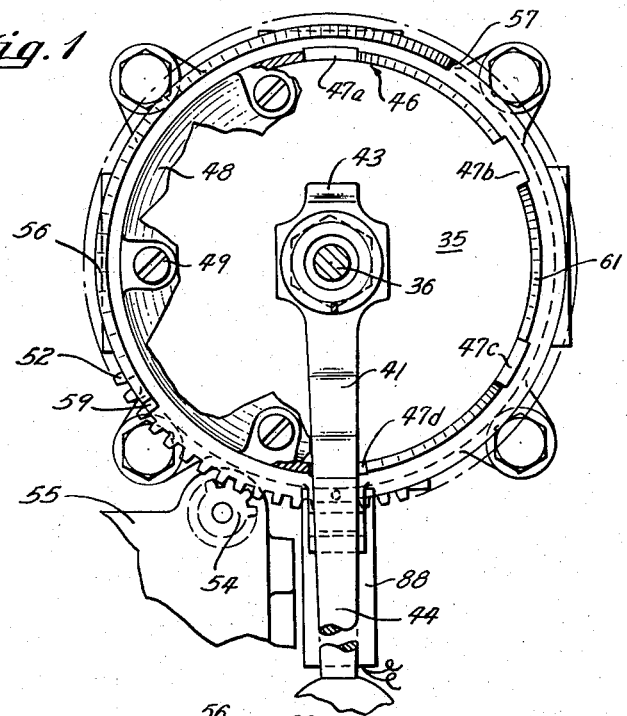
Figure 1 is an end view of the valve with parts broken away to illustrate details of construction.

The motor operated valve of the present invention is adapted for a multiplicity of uses. The valve, as herein shown and described, has a specific port and passage arrangement which is particularly adapted for use with the single tank type zeolite water softeners, such showing being by way of illustration only, it being understood that various other port and passage arrangements may be provided as required by the particular use which is made of the valve.

Referring more specifically to the drawings, the valve comprises a stator body 15, of any suitable configuration having a plurality of angularly spaced ports designated 16 through 22 extending through the face of the body and communicating with passages 23 through 27 therein. The valve may conveniently be of the type wherein the central passage 27 is arranged for communication with the raw water supply line, and a rotor 28 having a central spider 29 which overlies the central port 22 is provided to control the flows through the several ports in the stator. The rotor illustrated has a port 31 for passing raw water which enters through the central port 22 in the stator, and an arcuate flow passage 32 arranged to communicate several of the annularly spaced ports in the stator with each other. A cover or bonnet 33 having an annular side wall 34 and a top wall 35 is attached to the stator to form a fluid chamber therewith. A stem 36 is attached to the rotor 28 and slidably and rotatably extends through a gland 37 in the top wall of the cover for lifting, turning and reseating the rotor on the stator.

Figure 2:
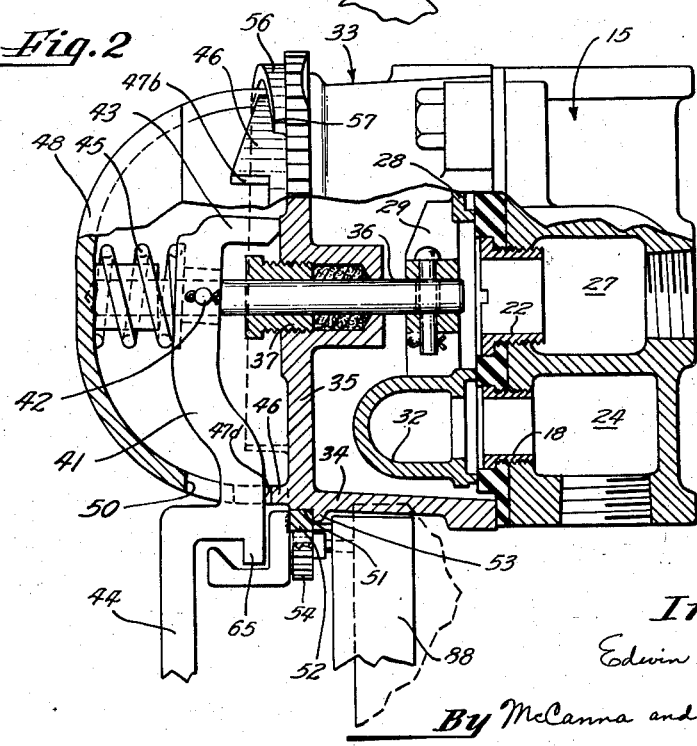
Fig. 2 is a side view of the valve shown partly in section.

The valve is preferably arranged for manual operation and for this purpose there is provided a lever 41 which loosely receives the stem 36 and is connected thereto by a pin 42 for pivotal movement about an axis transverse to the stem. A nose 43 is formed on one end of the lever and is arranged to engage the top wall of the cover to effect raising of the stem and rotor as the other end of the lever is lifted. A handle portion 44 is provided on the end of the lever remote from the nose 43 to permit manual operation of the valve, and a compression spring 45 is provided to yieldably urge the stem and lever downwardly in a direction to effect seating of the rotor on the stator. An index ring 46 is formed on the top wall 35 and extends upwardly therefrom, the index ring having a plurality of annularly spaced notches designated 47a through 47d formed therein for reception of the lever 41 in each of the rotative settings thereof. A dome shaped cap 48 is mounted on the cover by fasteners 49 and has an arcuate slot 50 therein to permit movement of the lever between its several angular settings in the notches 47. As shown in Fig. 2, the spring 45 is disposed around the stem 36 between the cap and the lever and yieldably urges the handle and stem downwardly.

The valve thus far described is arranged for manual operation by lifting the handle portion 44 to move the lever out of one of the notches 47 and simultaneously raise the rotor out of seated position on the stator, the handle being arranged to be turned to index the rotor to its succeeding setting at which position the handle is released so that the lever moves down into the next notch in the index ring and the rotor moves into seated position on the stator under the bias of spring 45.

In accordance with the present invention, the valve is arranged for motor operation between its successive positions without interfering with the manual operation of the valve so that the valve is adapted for semi-automatic operation wherein one or more steps of the rotor indexing can be effected manually and the remainder automatically. Alternatively, the valve may be arranged for fully automatic operation in which the manually operable feature is desirable in the event of faulty automatic operation. For this purpose an annular bearing surface 51 is formed on the external periphery of the side wall 34 of the cover and an annular ring gear 52 is rotatably mounted thereon, a shoulder 53 being provided to retain the ring gear in position. The ring gear is driven from a pinion 54 driven through suitable speed reducing gearing from an electrical motor 55 which is mounted in any desired manner in fixed relation to the valve cover 33 and, conveniently, the motor may be of the geared-head type. An annular upstanding cam 56 is formed on the ring gear and is arranged for clockwise rotation as viewed from the top of the valve, the cam having a leading edge 57 which is disposed in a plane below the bottom of the notches 47 in the index ring (see Fig. 2). The upper edge 58 of the cam 56 is inclined upwardly in a counterclockwise direction as viewed from the top of the valve and a stop 59 is provided adjacent the trailing edge thereof (see Figs. 5–8). The upper edge 61 of the index ring 46, between the notches 47 therein, is inclined upwardly as shown in Figs. 5–8 in a clockwise direction as viewed from the top of the valve to form a plurality of annularly spaced cams, the leading edges of which are spaced above the bottom of the notches 47 and the trailing edges of which are disposed slightly above the top of the stop 59 formed on the cam 56.

The manner in which motor operation of the valve is effected is illustrated in Figs. 5–8. As the ring gear rotates, the leading edge thereof moves under the lever 41 and lifts the latter until it clears the notch 47, the stop 59 on the trailing end of the cam 56 engaging the lever to turn the latter therewith. As the lever is turned, it engages the cam surface formed by the upper edge 61 of the index ring and rides upwardly thereon until the lever clears the stop 59 after which the cam 56 passes underneath the lever and the latter is retained in its lifted position by the index ring.

A radially extending ear 65 is formed on the lever and is spaced below the handle portion 44 and an inwardly extending finger 66 is mounted on an arm 67 carried by the ring gear and arranged so that the finger passes over the ear when the lever is in its lower position, but engages the ear when the lever is in its lifted position on the upper edge 61 of the index ring. The finger is spaced from the trailing end of the cam 56 a distance greater than the width of the ear. Thus, as the ring gear continues rotation, the finger 66 engages the ear 65 as illustrated in Figs. 6 and 9, and moves the lever angularly until it passes over the cam edge 61 and drops into the next notch (Fig. 7) in the index ring under the bias of spring 45. The finger then passes above the ear as the ring gear rotates since the lever is now in its lowered position (Fig. 8). On the succeeding revolution of the ring gear, the same sequence of operation occurs and effects indexing of the lever to the next position. Since the angle through which the lever moves in each indexing operation is determined by the spacing of the notches 47 in the index ring, it is apparent that the valve is operable between any desired angular settings and that angles between the several settings of the valve may be different.

Reference is now made to the control circuit shown in Fig. 10. The ring bear and cam 56 effect indexing of the lever and rotor from one position to a succeeding position each time the ring gear makes one revolution. The control circuit is arranged so that the motor 55 which drives the ring gear is energized to effect rotation of the ring gear through one revolution at selectively variable time intervals. This is achieved by the provision of a timer controlled starting circuit for the valve motor which energizes the motor at spaced time intervals, and a sustaining circuit which maintains the valve motor energized until the ring gear has rotated through one revolution.

The starting circuit for the valve motor includes a normally open switch 71 which is periodically closed under the control of the adjustable cams 72 on the cam wheel 73 driven by the timer motor 74. When starting the cycle of operations, main switch 76 is closed as by manually releasing latch 77 by manipulation of the starting lever 78 and power is applied from the plug 79 which is connected to a source of power through conductor 81, switch 76, conductors 82 and 83 to the normally open switch 71. The switch 71 is connected by conductor 84 to the valve motor 55, the valve motor being otherwise connected through conductor 85 to the plug 79. The switch 71 is open at the start of the cycle of operations so that the valve motor 55 is not energized when the main switch is initially closed. Closing of the main switch 76 also applies power through conductors 82 and 86 to the timer motor 74, the timer motor being otherwise connected through conductors 87 and 85 to the plug. After the timer has been in operation for a preselected time interval, the first cam 72 engages the switch 71 to complete the circuit to the valve motor thereby starting the latter.

The sustaining circuit for the valve motor is under the control of switch 88 having a follower 89 adapted to engage the ring gear which normally maintains the switch 88 closed. A notch 91 is provided in the ring gear into which the follower may move when the ring gear is in a predetermined angular position to thereby permit the switch 88 to open.

After the timer motor has been in operation a short period, the ring gear moves to a position such that the notch 91 therein does not register with the follower 89 whereby the ring gear closes the switch 88 to apply power from the main switch 76, through conductors 82, 86 and 92, through switch 88 and conductor 93 to the valve motor to thereby maintain the latter energized until the ring gear has completed one revolution at which time the follower 89 again moves into notch 91 and opens switch 88.

The ring gear is thus rotated through one revolution to effect indexing of the rotor, at spaced time intervals determined by the angular positions of the adjustable cams 72. At the completion of the cycle of operations, the timer motor is shut off to stop indexing operations. This is effected by a reset cam 95 also driven by the timer motor which reset cam engages the blade 76a of the switch 76 as the cam rotates to latch the blade 76b under latch 77 whereby, when the blade 76a reaches the well 95a on the reset cam, the switch 76 is opened to disconnect power from both the timer motor and the valve motor. A pilot light 96 is connected in parallel with the timer motor to visually indicate when the latter is in operation.

The multiport valve having the specific port and passage arrangement illustrated is particularly adapted for use with a single tank type zeolite water softener. When employed in connection with such a softening apparatus, passages 23 and 25 in the stator are connected through conduits to the top and bottom of the tank and passages 24 and 26 connected to service and drain respectively, the central passage 27 being connected to the raw water inlet.

During the service run, the handle is in notch 47d in the index ring and port 31 in the rotor registers with port 16 in the stator to pass raw water to the top of the tank. The soft water passes from the bottom of the treatment tank through ports 19 and 20 in the stator, through arcuate passage 32 in the rotor and port 18 in the stator to the service line. In one mode of regeneration of the treatment apparatus, the handle 44 is manually operated to move the rotor to a position in which the water is partially drained from the tank to permit adding of the salt to the tank. In the valve illustrated, the handle is manually moved to notch 47b at which position the arcuate passage 32 in the rotor communicates the stator ports 16 and 20 with drain port 21 so that the water level in the tank is lowered to permit adding the salt. The handle is then manually moved to the backwash position in notch 47a in the index ring and the switch 76 closed to start automatic operation of the valve. This effects indexing of the rotor between the successive positions. Since the drain position of the rotor for this valve is between the backwash and brining positions, the cam 72b is positioned close to cam 72a so that the rotor is stepped from the drain position in which the handle is in notch 42b to the brining position in which the handle is in notch 42c in rapid succession thereby effectively by-passing the drain position of the valve under automatic operation. Thus, although it is preferable to have the several operational positions to which the rotor must be moved in succession during the operational cycle arranged so as to occur at successive angular settings of the rotor, such an arrangement is not essential since any valve position can be effectively by-passed by appropriate arrangement of the cams 72.

I claim:

1. In a multiport valve including a ported stator, a cover attached to said stator forming a fluid chamber therewith and having an annular side wall and a top wall, a rotor disposed in said chamber and cooperable with said stator to control the flow of fluid therethrough, a stem attached to said stator and slidably and rotatably extending through said top wall of said cover centrally thereof, a lever attached to said stem externally of said cover and engageable with said top wall thereof to raise said stem and rotor when the lever is lifted and to turn said rotor when the lever is turned, a ring gear rotatably mounted on said annular side wall concentrically of said stem and having an upstanding annular cam thereon engageable with said lever, means for rotating said gear ring on said cover, an index ring on said top wall of said cover having a plurality of notches therein for receiving the lever at each of the rotative settings of the rotor, and spring means yieldably urging said lever to a lowered position and said rotor into seating engagement with said stator, and means including said upstanding annular cam and said index ring for lifting said lever out of one notch in the index ring and for thereafter turning said lever to the next notch in the index ring to move the rotor to a succeeding position thereof and for releasing the lever whereby said spring means is effective to move the lever to its lowered position in said next notch to thereby seat the rotor on the stator.

2. In a valve operating mechanism, the combination with a casing having an annular side wall and a top wall, a stem slidably and rotatably extending through said top wall of said casing centrally thereof, a lever attached to said stem externally of said casing and engageable with said top wall thereof to raise said stem and rotor when the lever is raised and to turn said stem when the lever is turned, an index ring on said top wall concentric with said stem and having a plurality of notches therein for receiving the lever, spring means yieldably urging said stem to its lowered position and said lever into one of said notches, a ring gear rotatably mounted on said side wall of said casing concentric with said stem and index ring and having an upstanding annular cam thereon engageable with said lever to lift said lever out one of said notches and for thereafter turning the lever with the ring gear as the latter rotates, said index ring having cam means thereon between said notches engageable with said lever to lift the latter out of engagement with said annular cam and for supporting the lever in a raised position, and means on said ring gear engageable with said lever when the latter is in said raised position for moving the lever along said cam means on the index ring to the next notch whereby the spring means is effective to move the lever into the next notch.

3. The combination of claim 2 including an electric motor for rotating said ring gear, circuit means including a switch for controlling energization of said motor, and a switch operating cam on said ring gear engageable with said switch for operating the latter to maintain said motor energized until the ring gear has completed one revolution.

4. In a valve operating mechanism, the combination of a casing including an annular side wall and a top wall, a stem slidably and rotatably extending through said top wall, a lever pivotally attached to said stem externally of said cover for movement about an axis transverse to said stem, said lever having a nose portion on one end engageable with said top wall and a handle portion on the other end extending outwardly of said side wall and adapted to be manually lifted and turned to raise and turn said rotor, an index ring on said top wall having a plurality of notches therein for receiving said lever in each of a plurality of different rotative settings, spring means yieldably urging said stem to a lowered position and said lever into one of said notches, a ring gear rotatably mounted on said annular side wall concentrically of said stem and having an upstanding cam thereon engageable with said lever to lift said lever out of one of said notches and thereby raise said stem, means for rotating said ring gear, said index ring having cam means on the upper edge thereof between said notches engageable with said lever to lift the latter out of engagement with said upstanding cam and for supporting the lever in a raised position, and means on said ring gear engageable with said lever when the latter is in said raised position for moving the lever along the cam means on said index ring to the next notch whereby the spring means is effective to move the stem to its lowered position as said lever drops into the next notch.

5. In a valve operating mechanism, the combination of a casing including an annular side wall and a top wall, a stem slidably and rotatably extending through said top wall, a lever pivotally attached to said stem externally of said cover for movement about an axis transverse to said stem, said lever having a nose portion on one end engageable with said top wall and a handle portion on the other end extending outwardly of said side wall and adapted to be manually lifted and turned to raise and turn said rotor, an index ring on said top wall having a plurality of notches therein for receiving said lever in each of a plurality of different rotative settings, spring means yieldably urging said stem to a lowered position and said lever into one of said notches, a ring gear rotatably mounted on said annular side wall concentrically of said stem and having an upstanding cam thereon engageable with said lever to lift said lever out of one of said notches and thereby raise said stem, means for rotating said ring gear, said index ring having cam means on the upper edge thereof between said notches engageable with said lever to lift the latter out of engagement with said upstanding cam and for supporting the lever in a raised position, an ear on said lever extending radially outward from said stem and spaced below said handle portion, a finger carried by said ring gear adapted to overlie said ear on said lever when the latter is in its lowered position in one of said notches and engageable with said ear when the lever is in its raised position supported on the upper edge of said cam on the index ring to move said lever along said index ring to the next notch whereby the spring means is effective to move said lever into the next notch and lower the stem.

6. In a valve operating mechanism, the combination with a casing, a stem slidably and rotatably extending through said casing, a lever attached to said stem externally of said cover adapted to be lifted to raise said stem and turned to move said stem to the next succeeding position while the stem is raised, spring means yieldably urging said stem to its lowered position, an annular ring gear disposed around said casing and rotatably mounted thereon concentric of said stem, an electric motor operatively connected to said ring gear for driving the same, circuit means including a switch for controlling energization of said motor, and cam means on said ring gear for operating said switch to maintain said motor energized until the ring gear has made one complete revolution, and means including an annular cam on said ring gear for lifting said lever to raise said stem and for thereafter turning said lever to move the stem to its next succeeding position each time the ring gear is turned through one revolution.

References Cited in the file of this patent
UNITED STATES PATENTS 2,235,287     Daniels _____ Mar. 18, 1941
2,610,511     Mansen _____ Sept. 16, 1952